(No Model.) 2 Sheets—Sheet 1.

D. NEALE.
COMPRESSOR.

No. 489,980. Patented Jan. 17, 1893.

(No Model.) 2 Sheets—Sheet 2.

D. NEALE.
COMPRESSOR.

No. 489,980. Patented Jan. 17, 1893.

Witnesses:
M. D. Bedal
W. E. David.

David Neale Inventor,
by Lon Vaughan
his attorney.

UNITED STATES PATENT OFFICE.

DAVID NEALE, OF FORT CALHOUN, NEBRASKA.

COMPRESSOR.

SPECIFICATION forming part of Letters Patent No. 489,980, dated January 17, 1893.

Application filed March 18, 1892. Serial No. 425,492. (No model.)

*To all whom it may concern:*

Be it known that I, DAVID NEALE, a citizen of the United States, residing at Fort Calhoun, in the county of Washington and State of Nebraska, have invented a new and useful Compressor, of which the following is a specification.

My invention relates to mechanism used in constructing fascines and mattresses for rip-rapping; the principal objects being; first, to compress the poles, brush, bagasse, straw or other material composing the fascines or mattress into a compact mass and retain the same until it can be firmly secured by withes, thongs or wires.

Figure 1:
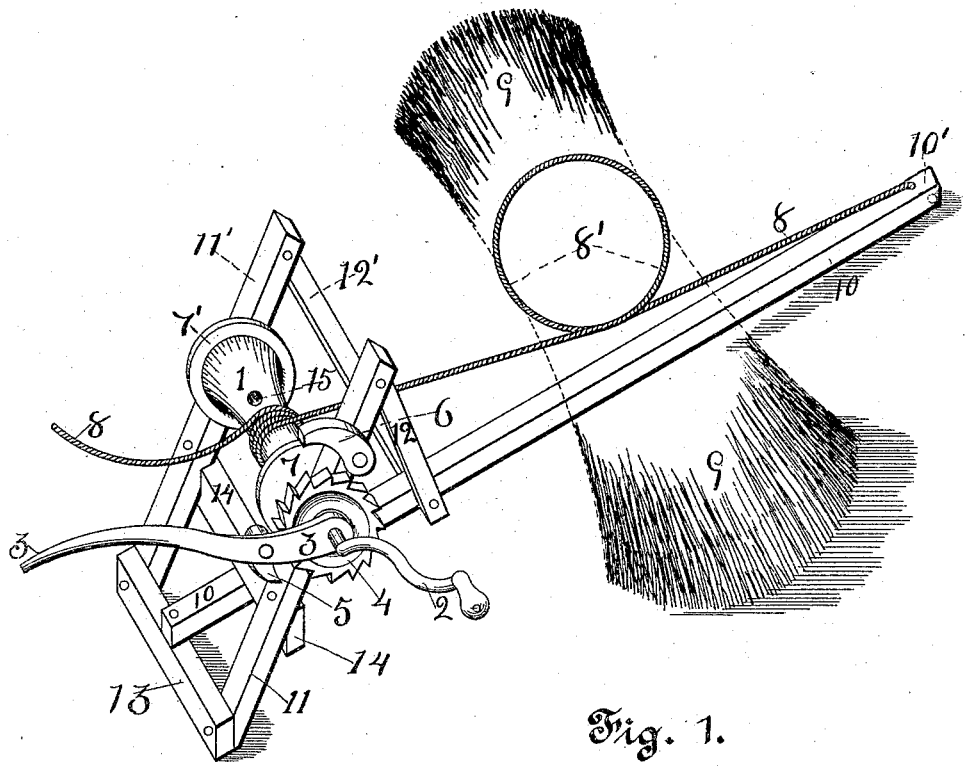
Figure 2:
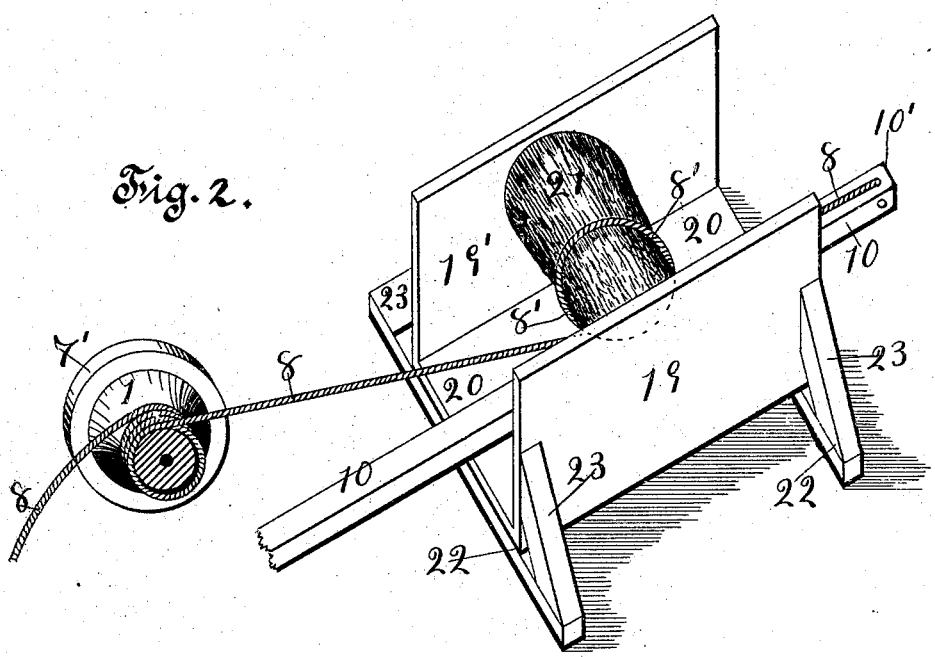

Figure 1, is a perspective view of my invention applied as a compressor to a bundle of brush. Fig. 2 is a perspective view of the compressor with the necessary box or mold used used in building bagasse straw or hay fascines.

Similar numerals refer to similar parts throughout the views.

The stanchions 11 and 11' having the cross-bars 13, 14 and 18 fitted and bolted on as shown and the strut or spar 10, one end bolted centrally between the cross-bars 13 and 14, the opposite end 10' extending indefinitely the central portion of the spar stayed by the braces 12 and 12' extending to and attached to the upper ends of the stanchions 11 and 11' forms the frame work of my machine.

A winch or windlass consisting of the crank 2, and the spool or drum 1, with enlarged ends 7 and 7' is journaled in and between the stanchions 11 and 11' as shown, one of the journals extending through the stanchion 11 and bent to form the crank 2; rigidly mounted on and revolving with this journal is the ratchet-wheel 4, also loosely mounted thereon is the lever 3, carrying the pawl 5, set to engage the ratchet-wheel; immediately above on the stanchion 11 is a pawl or detent set to engage the ratchet wheel and prevent it from turning backward.

In Fig. 1, a rope or cable 8, has one end attached to the extreme end of the spar at 10', it is then carried under, up over, once around the fascine 9 forming the single encompassing loop 8', thence on to the spool or drum 1 to which it is made fast by a number of coils around same or inserting the end through the aperture 15.

In operation it will be apparent that power applied to the crank 2, winding the rope 8, on the drum 1, the draft on this end of the rope reduces the loop 8' in circumference thus compressing the fascine 9. The pawl 6 engages the ratchet-wheel 4 holding the compression on until a thong, withe or wire has been fastened around the fascine near the loop 8' when the compression is let off and the loop shifted to another point and so on throughout the whole length of the fascine, until the whole is compressed and bound; as the fascines are made in varying sizes up to as large as twenty five feet in diameter and sometimes continuous in length, they are practically immovable during construction and while binding; hence, they are necessarily made on the ground, or on low skids near the ground, ready to be launched into the stream; to meet these conditions the spar 10 having the rope 8 attached at its extended end 10', is adapted to be easily thrust under the fascine between it and the ground, and as easily withdrawn, after the binder is placed, to shift the compressor to the next desired position; further, when the compressor is in operation, the spar carrying one end of the rope moves longitudinally as far as the opposite end of the rope winding on the drum, the spar and frame sliding on the ground, gives the same amount of movement and draft to each end of the rope, the fascine not being moved laterally or rolled, but shrinking in circumference as the compression is applied. When a large heavy compressor is required wheels are attached to each end of the cross-bar 13 to facilitate moving the compressor about, when more power is required than given by the crank the lever 3 carrying the pawl 5 set to engage the ratchet wheel, may be used, its length giving great purchase; when not needed it is pendent on the shaft the pawl also hanging disengaged.

When it is desired to compress and bind short fine material such as bagasse hay, straw &c. a box or mold as shown in Fig. 4, with the bottom 20 and two upright sides 19 and 19' is found necessary to hold the material together until the loop 8' can be made around it, the spar being placed before filling the box; in this view the frame of the machine is cut away showing only the box, spar, rope and a portion of the drum, showing also the bed pieces 22, and braces 23 which support the bottom and sides of the box or mold: the sides of mold may be hinged at bottom so as to fall down flat after the fascine is bound, thus facilitating the removal of the bound fascine.

Having fully described my invention what I claim as new and desire to secure by Letters Patent is:—

In a fascine compressor the combination of a frame-work supporting a winding-drum and having a long spar projecting from near its base, the spar adapted to be thrust under the fascine between it and the ground, a rope one end attached to the extreme end of the spar, then carried around the fascine forming a single encompassing loop, the opposite end wound on the drum substantially as shown and described.

Signed at Blair, in the county of Washington and State of Nebraska, this 14th day of March, 1892.

DAVID NEALE.

Witnesses:
J. H. STRUVE,
W. E. DAVID.